May 19, 1953  H. P. CURLEE  2,638,868
SANDWICH MACHINE FOR APPLYING COATINGS TO BAKERY GOODS
Filed March 2, 1948  7 Sheets-Sheet 1

Inventor
Harvey P. Curlee

By
Bailey, Stephens & Huettig
Attorneys

May 19, 1953  H. P. CURLEE  2,638,868
SANDWICH MACHINE FOR APPLYING COATINGS TO BAKERY GOODS
Filed March 2, 1948  7 Sheets-Sheet 3

Inventor
Harvey P. Curlee
By Bailey, Stephens, & Huettig
Attorneys

May 19, 1953 — H. P. CURLEE — 2,638,868
SANDWICH MACHINE FOR APPLYING COATINGS TO BAKERY GOODS
Filed March 2, 1948 — 7 Sheets-Sheet 4

Inventor
Harvey P. Curlee
By Bailey, Stephens, & Huettig
Attorneys

May 19, 1953  H. P. CURLEE  2,638,868
SANDWICH MACHINE FOR APPLYING COATINGS TO BAKERY GOODS
Filed March 2, 1948                                 7 Sheets-Sheet 6

Inventor
Harvey P. Curlee
By Bailey, Stephens, & Huettig
Attorneys

Inventor
Harvey P. Curlee

By
Bailey, Stephens & Huettig
Attorneys

Patented May 19, 1953

2,638,868

UNITED STATES PATENT OFFICE 2,638,868

SANDWICH MACHINE FOR APPLYING COATINGS TO BAKERY GOODS

Harvey P. Curlee, Raleigh, N. C., assignor to Curlee Machinery Company, Inc., a corporation of North Carolina Application March 2, 1948, Serial No. 12,661

4 Claims. (Cl. 118—27)

This invention is directed to the construction of a machine for coating articles. In particular, it relates to a machine for putting coatings of icing on cookies or crackers, or for putting filling materials on crackers to make sandwiches. These machines are usually termed sandwich machines.

Sandwich machines are employed in food plants for the purpose of automatically applying filling material in between two layers of cracker or cake material, or for depositing icing or some similar confection upon the top of a cookie or a cake. In order to be economical, these machines must operate with a greater volume of output than could be obtained by a comparative number of persons doing the same job manually. At the same time, the speeds of the machines are limited by the rapidity with which they can handle delicate materials such as cakes or crackers without breaking the same. Another limiting factor is the speed at which the sandwich or icing material can be placed upon the cakes or crackers as they are moved past a depositing device, for if the deposited material is not accurately spotted upon the cakes or crackers, the product emitted from the machine may be so spoiled in appearance as to be unusable.

The prior art efforts to overcome these difficulties were largely directed to the use of stencils which cooperated with a conveyor holding the cakes or crackers so as to bring the stencil over a cracker in timed relation with respect to a superimposed hopper, the covering material being deposited through the stencil onto the cake or cracker. Where the stencil was dispensed with, it has heretofore been possible only to deposit a relatively large filling upon a pan filled solidly with cake as it passes beneath the hopper. Where such large objects are being treated, it is not necessary to exercise the fine control which has to be maintained in the treatment of relatively small cakes or crackers, such as in making the familiar peanut butter cracker sandwiches.

It is an object of this invention to construct a machine in which cakes or crackers are handled in such a way that they are not subject to breakage experienced in prior art machines.

Another object of the invention is to produce an icing or sandwich-making machine in which the cakes or crackers are moved in timed relation with respect to feeding mechanisms.

A further object of the invention is to construct a sandwich or icing machine, upon which cakes or crackers are deposited upon a conveyor without breakage.

Another object of the invention is to produce a machine of the class described in which the articles to be coated are brought in timed intermittent operation beneath a hopper containing the coating material.

A further object of the invention is to produce a means for cleanly depositing coating material, especially sticky covering materials, upon an article as it is moved beneath the depositor.

A further object of the invention is to construct a sandwich-making or icing machine having a magazine feed of articles upon a conveyor and a depositor for placing covering materials on the articles with a synchronized intermittent timing of the parts so that the materials are quickly and cleanly handled in the machine.

In general, these objects of the invention are obtained by constructing a machine which has a conveyor belt passing beneath at least one magazine, and a hopper containing the material to be deposited upon articles carried from the magazine. Suitable drives are provided for intermittently moving the conveyor, and during such intermittent movements operating the machine to deposit crackers upon the belt. At the same time, this gearing intermittently operates a feed pump and a cut-off device so that as the articles are carried beneath the hopper, a piece of coating material is extruded from the hopper and cut off to be cleanly and accurately deposited upon the article on the conveyor. If desired, the article can then be conveyed beneath a second magazine which deposits a second article over the coating material to form a sandwich. The machine is arranged to take relatively small flat objects, in the nature of small wafers or crackers, with adjustments so that it can handle such wafers or crackers of either small or large size. By reason of the intermittently controlled synchronized movement of the parts, it is not necessary to use stencils to insure the proper placement of the materials upon the articles carried by the conveyor. The machine, therefore, is of comparatively simple construction.

The means by which the objects of the invention are obtained, are more fully described with reference to the accompanying drawings in which.

The apparatus is composed of a conveyor A carried upon a frame B for the purpose of transporting crackers or the like from a magazine C beneath an icing or filling depositor D, and in the case of sandwich making, beneath a second magazine E. Frame B is simply constructed of angles and channels to support this mechanism and the motor M and driving gears G. As illustrated, the apparatus is built as a multiple unit to process simultaneously five lines of crackers, it being apparent that either one or a multiple of lines can be constructed in a single machine. As the machine is symmetrical, only the individual parts of a single line are described in detail.

The conveyor

The top of frame B is composed of two longitudinally extending spaced channels 2. Four bearings 4 are mounted on channels 2 adjacent the corners of frame B, these bearings supporting shafts 6 upon which are mounted cog wheels 8, four in number, which in turn support parallel endless chains 10. Rods 12 extend transversely between chains 10, these rods carrying pairs of pins 14. The upper reach of chains 10 is supported by bars 16, Figures 1 and 7, which are joined to frame B and serve to prevent chains 10 from sagging. Adjacent depositor D, Figure 1, is a vertically adjustable supplemental transverse support 20 upon which bars 16 bear.

A pair of angles 22, 24 extend parallel to chains 10, the angles of each pair being spaced to form a pathway for each pair of pins 14. Angles 22, 24 form trackways for supporting articles which are pushed along the trackways by pins 14.

Figures 2, 7:
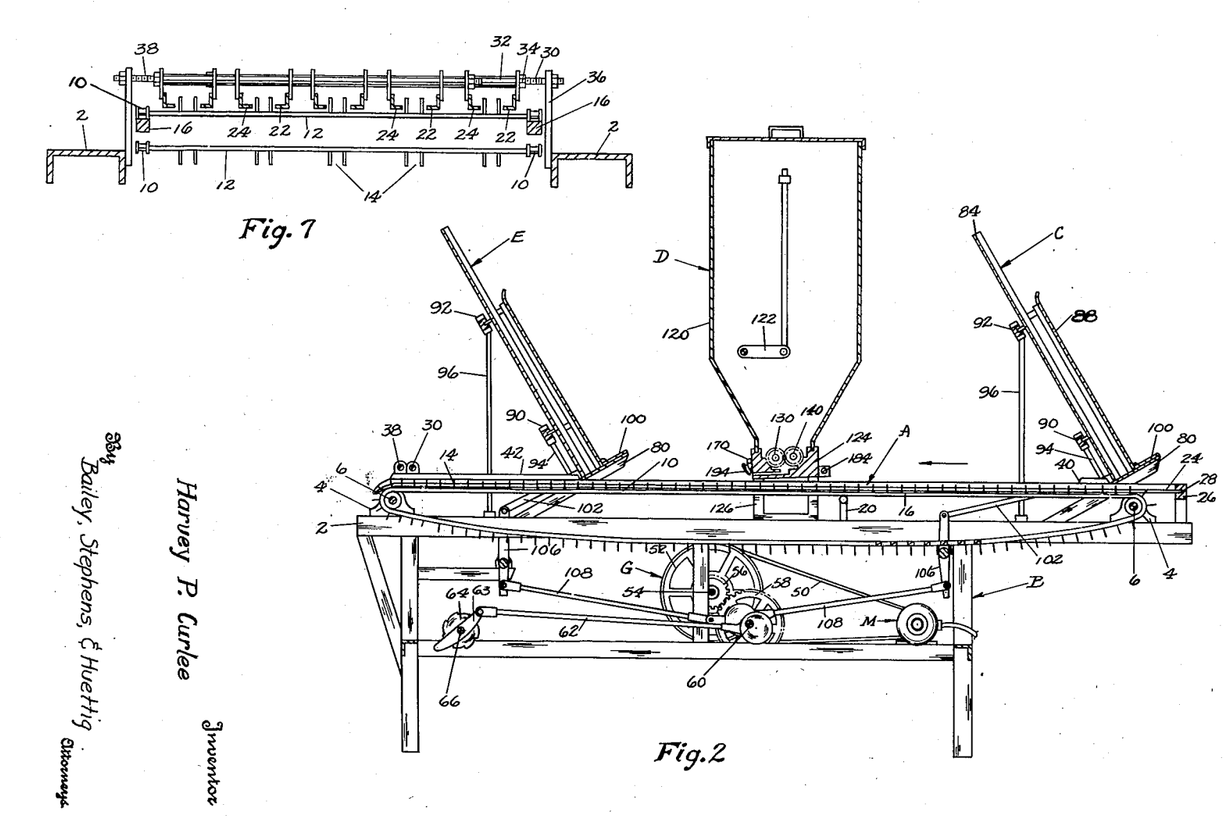
Fig. 2 is a longitudinal cross-sectional view of Fig. 1.
Fig. 7 is a cross-sectional view on the line 7—7 of Fig. 3.
Figures 3, 4, 8, 14:
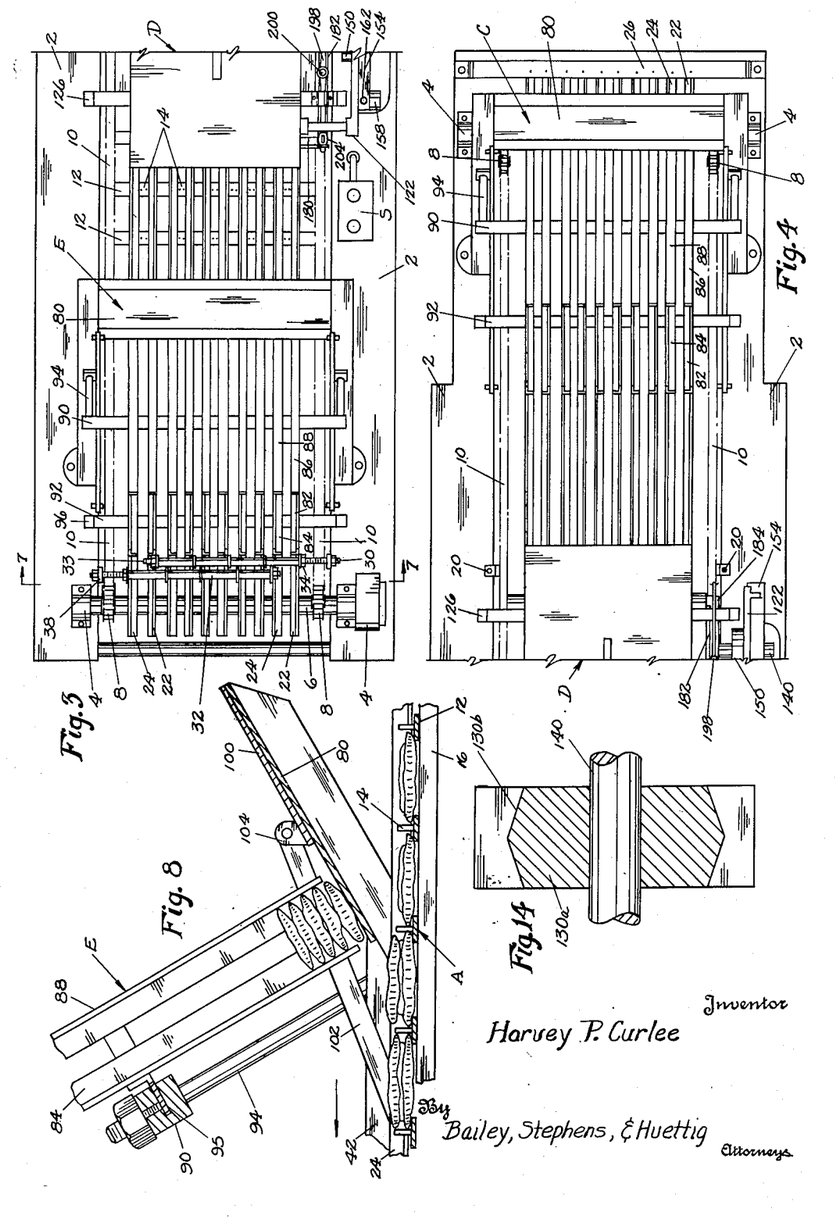
Fig. 3 is a plan view of the left half of Fig. 1.
Fig. 4 is a plan view of the right half of Fig. 1.
Fig. 8 is an enlarged cross-sectional view of a detail of the article feeding magazine.
Fig. 14 is a cross-sectional view of a gear used in the feed pump.
Figure 5:
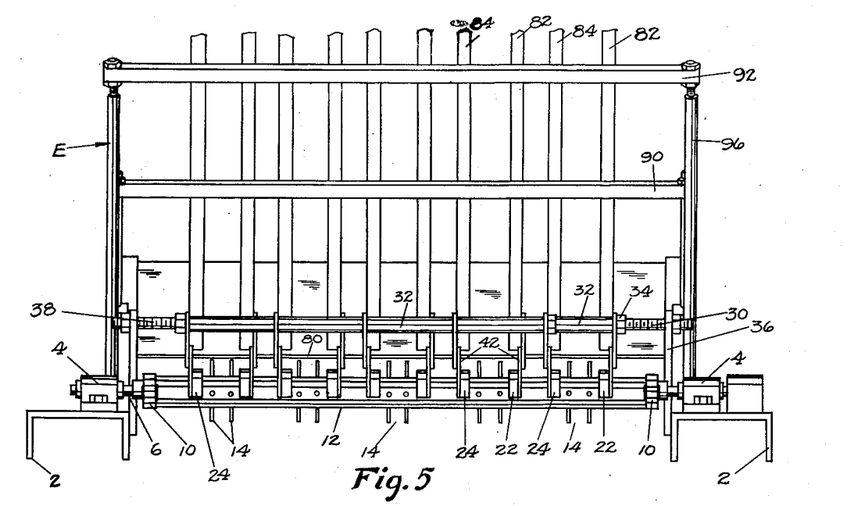
Fig. 5 is a side elevational view of the upper portion of Fig. 1 as seen from the left.
Figure 6:
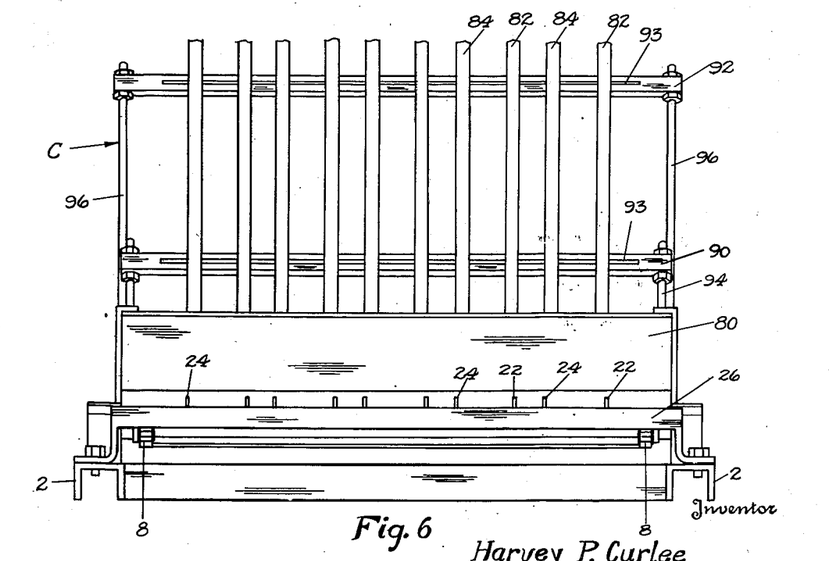
Fig. 6 is a side elevational view of the upper portion of the right side of Fig. 1.

These trackways are adjustable toward or away from each other in order that they may carry articles of different widths. In Figures 2, 4 and 6, one end of angles 22, 24 is supported by a bar 26 mounted upon channels 2, and having a slot 28 longitudinally thereof for receiving the ends of the angles, said angles being movable toward or away from each other in said slot. At the other end of the machine, Figures 2, 3, 5 and 7, all angles 22 are hung from a transverse rod 30, the hangers for the angles being separated by spacers 32, the rod being threaded to receive a nut 34. By inserting spacers 32 of different lengths, the positions of angles 22 can be altered. Rod 30 is supported from channel 2 by standard 36. Similarly, all of angles 24 are hung from transverse rod 38 employing similar spacers 32. Thus as longer spacers are used on each rod, the angles in each pair of angles 22, 24 will be pushed closer together to lessen the gauge of the trackway formed by them, and vice versa. Adjacent to magazines C and E, the vertical flanges of angles 22, 24 are doubled in height, as shown at 40 and 42, respectively, Figures 2 and 5.

Figures 1, 13:
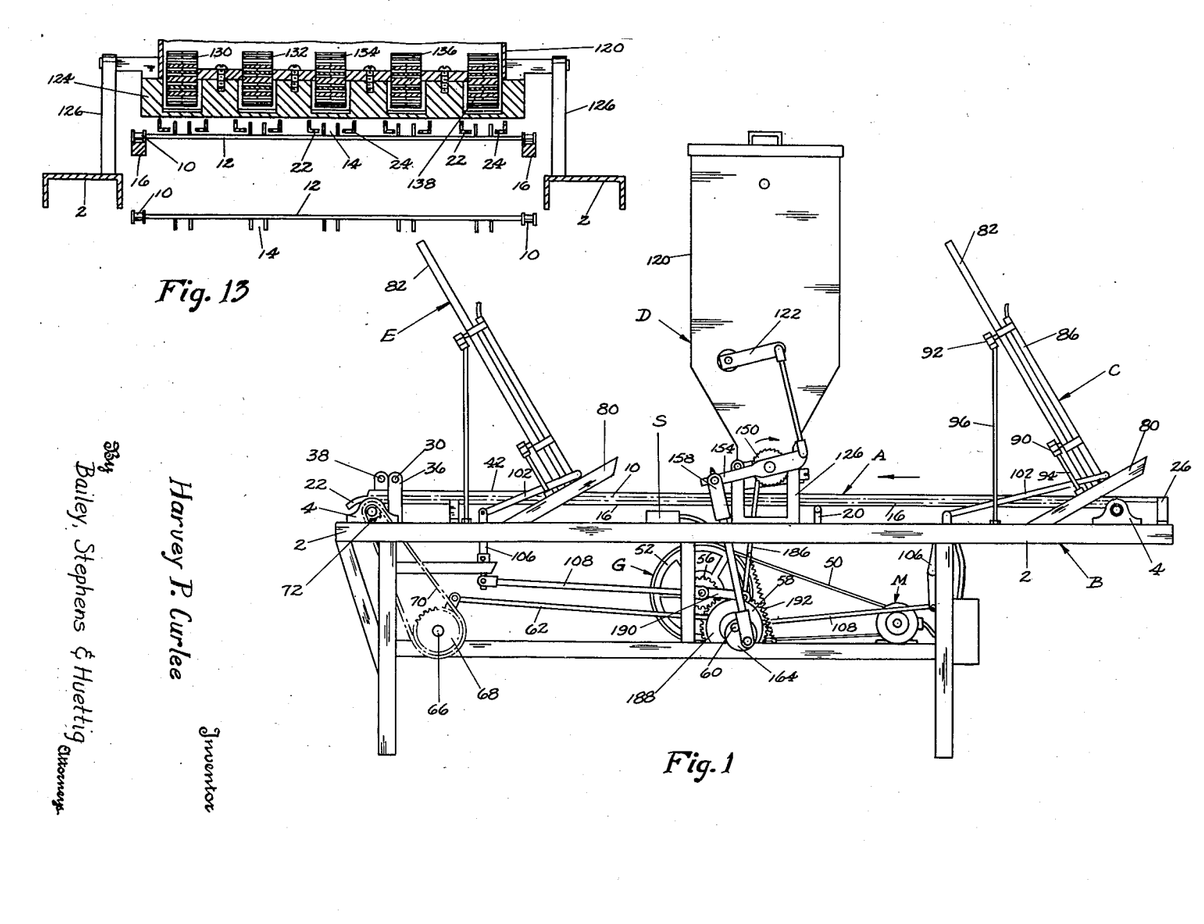
Fig. 1 is a side elevational view of a machine constructed according to my invention.
Fig. 13 is a cross-sectional view on the line 13—13 of Fig. 12.

Motor M, Figures 1 and 2, is the prime mover for gearing G through belt 50 driving gear 52 fixed to shaft 54. Gear 56, connected to shaft 54, drives in turn gear 58 which turns crankshaft 60. Rod 62 connected to the crankshaft actuates pawl 63 and ratchet 64 on each revolution of crankshaft 60. Shaft 66 turned by ratchet 64 drives gear 68, chain 70 and gear 72 secured to shaft 6, thus imparting intermittent movement to conveyor A.

The magazine

Magazines C and E are similar in construction and operation. Each is composed of a base plate 80, Figures 1, 2 and 8, mounted upon channels 2 at an angle of about 30°. Extending perpendicularly to base plate 80 is a rack formed of pairs of angles 82, 84 conforming to the pairs of angles 22, 24 of the trackway for conveyor A, and each pair constituting a chute. Cover angles 86, 88, respectively, are attached to angles 82, 84 over the lower portion thereof to complete the chute-like structure. The individual angles 82, 84 are supported upon bars 90 and 92, having slots 93, Figures 6 and 8, said angles having lugs 95 slidable in the slots so that the angles are adjustable to make chutes of different sizes. Rods 94 secure bars 90 to base plate 80, while rods 96 mounted upon channels 2 sustain bars 92.

Base plate 80 carries an ejector plate 100 slidable thereon. The lower ends of the chutes are spaced the thickness of one of the articles above plate 80, the ejector 100 being slidable beneath all the chutes to push the lowermost articles from the row of chutes onto the conveyor.

Ejector 100 is actuated by arm 102 pivotally secured to lug 104 attached to ejector plate 100. Lever 106 connects arm 102 with rod 108, the latter being joined to crankshaft 60. Action of the ejector is thus synchronized with the movement of conveyor A.

The depositor

Depositor D includes a pump for extruding filling or icing material onto the articles carried by conveyor A, and a device for cutting off lengths of the material as it is extruded by the pump.

The pump comprises a hopper 120 containing an agitating mechanism 122, and a gear box 124, said box being supported upon channels 2 by standards 126, and being tilted to bring its extruding orifice as close as possible to articles carried by conveyor A.

Figure 11:
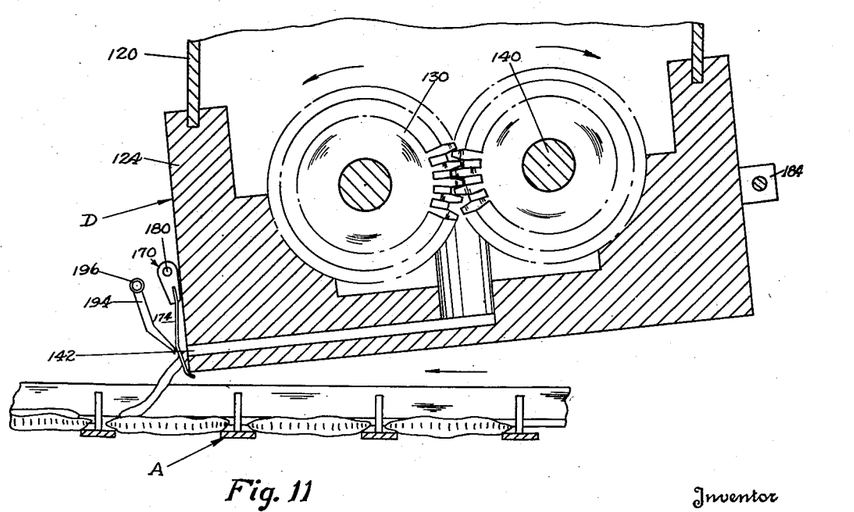
Fig. 11 is an enlarged detailed cross-sectional view of the material feed pump shown in Fig. 2.
Figure 12:
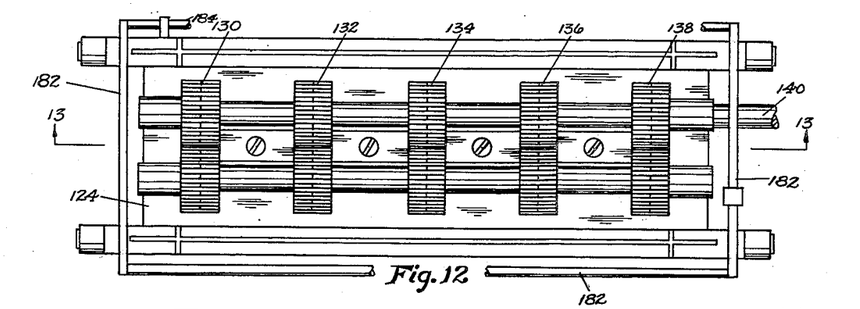
Fig. 12 is a plan view of Fig. 11.
Figure 15:
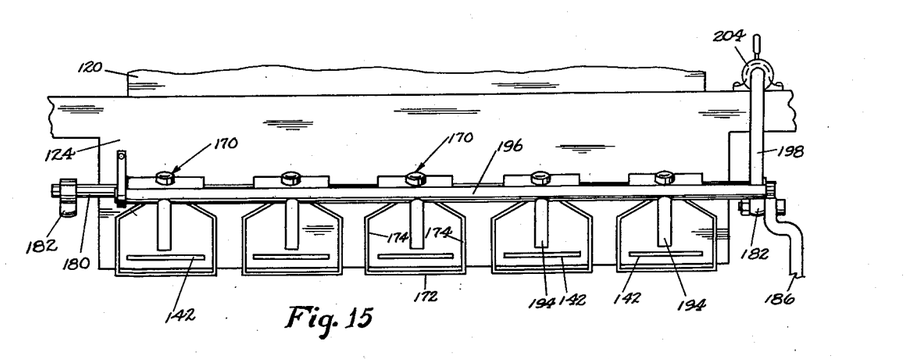
Fig. 15 is a side view of Fig. 11.
Figure 16:
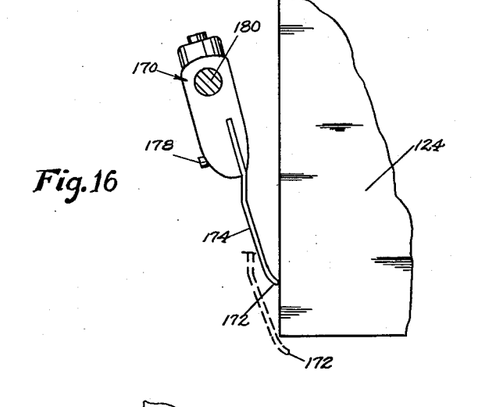
Fig. 16 is an enlarged detailed view of the shear element.
Figure 17:
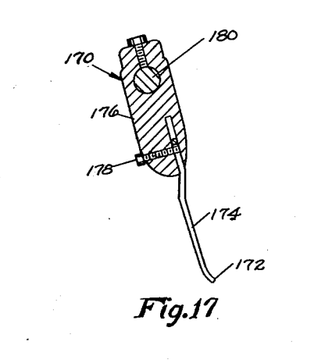
Fig. 17 is a cross-sectional view of Fig. 16.

Mounted within gear box 124 are pairs of gears 130, 132, 134, 136, 138, forming, respectively, five gear pumps, one for each of the trackways on conveyor A. These gears are fixed to drive shaft 140, and extrude material through orifices 142, Figures 11 and 15. Because of the sticky, plastic nature of the materials usually being pumped, the individual gears, as shown by gear 130a, Figure 14, are made self-cleansing by tapering the bottoms 130b of the tooth cavities outwardly from the median plane of the gear and toward the axis of the gear. This mechanism is fully described and claimed in my copending application, S. N. 12,662 filed March 2, 1948.

Figure 9:
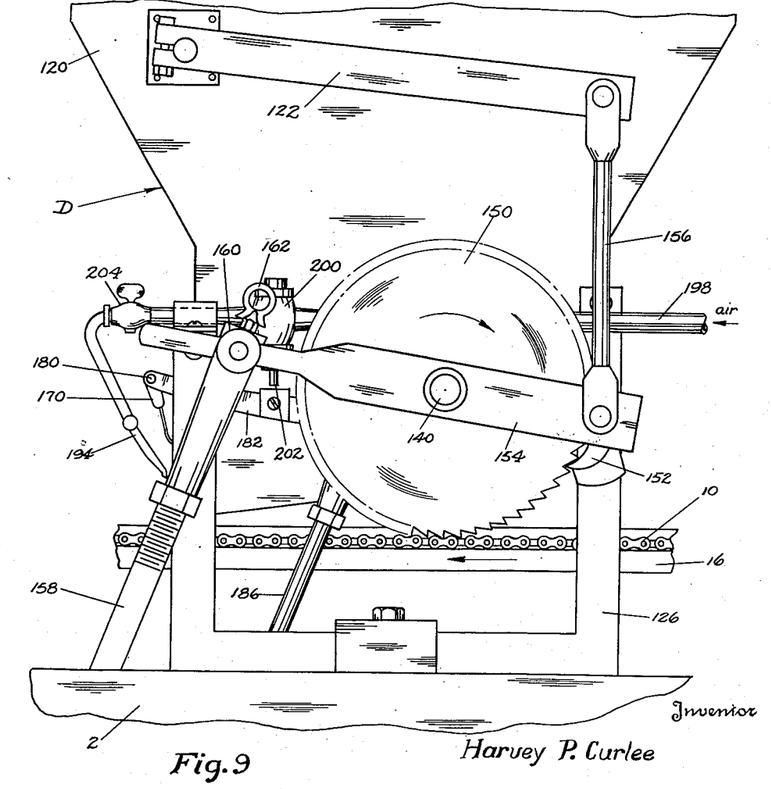
Fig. 9 is a side elevational view of an enlarged detail of the material depositing mechanism shown in Fig. 1.
Figure 10:
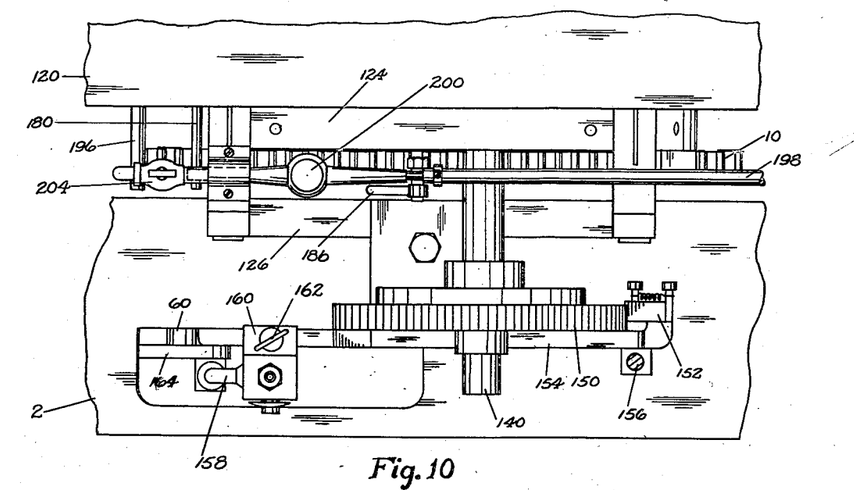
Fig. 10 is a plan view of a portion of the apparatus shown in Fig. 9.

The gear pumps are operated intermittently in timed relation to movement of conveyor A. Shaft 140 has ratchet wheel 150 fixed thereto, Figures 1, 9 and 10. Pawl 152, pivoted to lever 154, rides on ratchet 150, lever 154 being fulcrumed on shaft 140. Lever 154 also actuates rod 156 attached to agitator 122.

The opposite end of lever 154 is pivotally joined to rod 158 through a slidable connection 160, the position of rod 158 on lever 154 being secured by set screw 162. It is apparent that the degree of rotation of ratchet 150 is increased or decreased by altering the length of the lever arm between set screw 162 and shaft 140. The lower end of rod 158 is journaled upon an eccentric 164 fastened to crankshaft 60. Each revolution of crankshaft 60 thus reciprocates rod 158, and lever 154. The upward stroke of rod 158 causes pawl 152 to engage ratchet 150, and turns shaft 140 and the gear pumps a distance determined by the length of the lever arm between set screw 162 and shaft 140. The gear pumps are inoperative on the downward stroke of rod 158.

Special means are provided for shearing lengths of the extruded material as it is emitted from orifice 142. A shearing element 170 is mounted for movement across each orifice 142, Figure 15. Each element 170 is composed of a wire bent to form a horizontal portion 172 having a length slightly greater than the width of orifice 142, and leg portions 174 the upper ends of which are converged and held in a fitting 176 by set screw 178. The legs 174 are bent adjacent horizontal portion 172 so that this portion is spring pressed against the face of gear box 124. Fitting 176 is fixed to shaft 180 at an angle which keeps portion 172 in tight engagement with the face of the gear box.

Shaft 180 is vertically reciprocated by levers 182, one on each side of gear box 124 and fulcrumed thereto, the opposite ends of the levers being joined by rod 184, Figures 1, 9, 11 and 15. A rod 186 has its upper end secured to one of the levers 182, the lower end of this rod resting on cam 188 fixed to shaft 60, said lower end being maintained in position by being pivotally joined to one end of a rocker arm 190 whose other end is freely pivotally mounted on shaft 54. Spring 192 secured under tension between rod 186 and frame B holds the rod in tight engagement upon the cam 188.

The shear element is actuated by movement of gearing G which rotates cam 188. Rod 186 riding on the cam is vertically reciprocated, and on its upward movement raises levers 182. Rod 180 fixed to the levers is thus raised, and in its upward motion lifts shear elements 170. The shear elements in their normal position are below orifice 142 and function when rising to cut off material being extruded through orifice 142. As cam 188 further rotates, shear elements 170 drop into their lowermost position in which horizontal portion 172 slides over the lower edge of the gear box. The rubbing of horizontal portion 172 across the lower edge assists in loosening material which may be sticking to the wire shearing element.

As it is necessary to have the extruded material quickly separated from the orifice 142 and deposited upon the articles on the conveyor belt A, a second means is provided to deposit the extruded material on the articles. This is composed of an air jet impinged across the extruded material from nozzles 194 mounted above shear elements 170. There is, of course, one nozzle for each of the orifices 142. These nozzles are fed from a manifold 196 secured to the face of the gear box, and fed from a pipe 198 connected to a source of air pressure. Operation of the air blast is through valve 200 having a plunger 202 which is contacted by a lug attached to lever 182, note Figure 9. As lever 182 is raised, plunger 202 is moved thus opening valve 200 and permitting a blast of air to enter manifold 196, the air being emitted through nozzles 194 as shear element 170 moves across the face of the gear box.

The degree of air pressure in manifold 196 is adjusted by valve 204.

Operation

The apparatus is extremely simple and effective in its operation, the synchronization of its elements being such that the articles to be coated are placed on the conveyor belt and moved to the depositor in a step-by-step fashion. When peanut butter sandwiches, for example, are being made, the crackers are placed in the magazines C and E. The machine is then started by simply pressing the starter button or switch S, the motor M rotating crankshaft 60 and actuating ratchet 64 to give intermittent motion to conveyor A. A pocket formed between successive pairs of pins 14 at the beginning of the movement of conveyor A is just beginning to come beneath the outlet of the magazine, note Figure 8. As conveyor A is being moved, the ejector plate 100 of magazine C begins its downward stroke by action of the rods 102 connected to crankshaft 60. Conveyor A continues to move, and plate 100 continues downward to push a cracker from the magazine into the unfilled pocket formed between adjacent pins 14 on the moving conveyor A. As plate 80 is inclined, the cracker is pushed into the plate at an angle so that its lowermost or forward advancing edge is slid into the pocket before its rearmost edge clears base plate 80. This means that the cracker is positively deposited into the pocket, and is not thrown nor vertically dropped into the pocket, in the sense that there is a free vertical fall of the cracker. Consequently, the advantages are obtained in that the cracker does not bounce or fall out of the nest into which it is deposited, and the cracker, not being dropped any substantial distance, will not break.

Further rotation of crankshaft 60 returns ejector plate 100 to its rearward position, and the conveyor is momentarily stopped.

Figure 18:
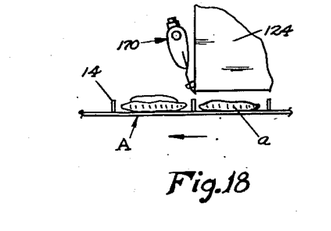
Figs. 18 and 19 are diagrammatic views showing various positions of the conveyor when in operation beneath the depositor.
Figure 19:
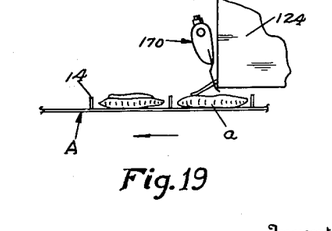

Continued intermittent operation brings the crackers to a stationary position beneath depositor D. At this point, note Figures 18 and 19, the forward edge of the next uncoated cracker a has not yet cleared the edge of gear box 124. Crankshaft 60 actuates rod 158 which in turn causes ratchet 150 to be moved and turns the gear pumps. The pumps extrude material from orifice 142, the conveyor simultaneously being moved forward, Figure 19. The amount of material extruded is dependent upon the distance ratchet 150 is rotated, this being adjusted by the position of rod 158 or lever 154. In other words, only a short stroke is required for depositing a little material for a short cracker, whereas a longer stroke is required for depositing more material upon a longer or larger cracker.

The gear pumps are operated during the vertical movement of rod 158. As this stroke is completed, conveyor A stops, and cam 188 actuates rod 186 to raise shear elements 170. At this instant, the extruded material has come out of the orifice 142 far enough so that it is resting at one end upon the cracker on conveyor A. The conveyor continues to move the cracker forwardly and then stops. Then shear element 170 raises and slides across orifice 142 separating the material from the orifice. No material is being extruded at this moment as rod 158, which actuates the gear pumps, is in its downward stroke. Shear element 170 having been lifted by the cam immediately returns to its lowermost position, and as horizontal portion 172 slides across the lower edge of gear box 124, the material being extruded is rubbed off of the wire.

Upward movement of the shear actuating arm 186 also opens air valve 200 so that just before the shear element has moved across the face of orifice 142, a blast of air impinges on the material and presses it upon the cracker, and assists in freeing the material from the shear element. Shear element 170 is by itself a very cleanly operating mechanism for cutting off the extruded material. It can handle the stickiest of materials by itself, and is even more efficient when used in combination with the air blast.

The cycle is continued with the crackers arriving at magazine E in timed sequence so that as each cracker passes beneath this magazine, a cover cracker is placed on the previously coated cracker on the conveyor to form a sandwich. As described for magazine C the coated cracker is being moved as the top cracker is placed on it from magazine E. This movement permits the top cracker to come to rest on the coating without displacing the coating from the lower cracker, as would be the case if the conveyor A were stopped. The completed sandwich is removed from the machine at the left side of Fig. 1.

When the size of the cakes or crackers to be coated has been selected, magazines C and E first must be adjusted to the proper size, such adjustment being made by moving angles 82 in slots 93. Then angles 22 and 24 must be adjusted to the same size, this being done by varying the size of spacers 32 on rods 36 and 38, the opposite ends of angles 22 and 24 being properly located in the slot in bar 26.

Filling material is placed in hopper D, this material being kept in contact with the gear pumps by actuator 122.

The intermittent operation of the conveyor A in timed relation with the turning of the gear pumps makes it possible to eliminate the use of stencils, such as are employed in the prior art machines, thus not only simplifying the apparatus, but permitting the apparatus to operate at a higher speed. Although the so-called speed of the machine may be high in comparison with prior art machines, yet cracker breakage, and spoilage due to misalignment of filling material on the cracker, is avoided because actually the parts of the machine move relatively slowly with respect to each other as the crackers are being handled. Consequently, a slowing of the movement of the relative parts permits an overall increase in speed for the machine, and a greater output therefor.

Having now described the means by which the objects of my invention are obtained, I claim:

1. In a sandwich machine for coating fragile articles such as crackers, cookies, or cakes with sticky coating material, said machine including an article holding magazine, a movable article ejecting plate in said magazine, a depositor, a coating extruding mechanism in said depositor, a power driven conveyor movable beneath both said depositor and magazine, a power driven drive shaft, means for power actuating said ejecting plate from said drive shaft, means for power operating said extruding mechanism from said drive shaft, and means for power operating said conveyor from said drive shaft, the improvement comprising a first eccentric element driven by said shaft and connecting said conveyor operating means to said shaft for intermittently moving said conveyor, a second eccentric element driven by said shaft in offset relation to said first element and connecting said shaft to said means for actuating said article ejecting plate for actuating said plate to deposit an article on said conveyor only when said conveyor is moving, and a third eccentric element driven by said shaft in offset relation to said first and second elements and connecting said shaft with said means for operating said coating extruding mechanism to operate said mechanism initially only as said conveyor is moving, and finally as said conveyor is stationary, said eccentrics being so shaped and offset with respect to each other as to complete the depositing of an article from said magazine onto said conveyor and to coat an article beneath said depositor during one complete cycle of the intermittent operation of said conveyor.

2. In a sandwich machine as in claim 1, said drive shaft comprising a crankshaft, and said eccentrics comprising cranks on said shaft.

3. A shear element for a material depositor having an extruding orifice in one face thereof, an edge of said face being below said orifice, comprising a horizontal wire, leg means for holding said wire in lower position beneath said edge of said depositor, means for raising said wire while being held by said leg means spring-pressed against the face of said depositor and across said orifice during the material shearing stroke and for returning said wire to said lower position, and means for producing a downwardly directed air blast on said wire during the upward stroke of said wire.

4. A shear element as in claim 3, said air blast means comprising a nozzle mounted adjacent said orifice, and means for supplying air intermittently to said nozzle.

HARVEY P. CURLEE.

References Cited in the file of this patent

UNITED STATES PATENTS

| Number | Name | Date |
|---|---|---|
| 647,403 | Harton | Apr. 10, 1900 |
| 972,649 | Rose | Oct. 11, 1910 |
| 1,029,357 | Gage | June 11, 1912 |
| 1,160,532 | Savy | Nov. 16, 1915 |
| 1,309,550 | Stancliff | July 8, 1919 |
| 1,667,692 | Salerno | Apr. 24, 1928 |
| 1,793,158 | Clayton | Feb. 17, 1931 |
| 1,881,747 | Litty et al. | Oct. 11, 1932 |
| 2,279,686 | Kerlin | Apr. 14, 1942 |
| 2,348,400 | Manspeaker | May 9, 1944 |
| 2,478,401 | Johnson | Aug. 9, 1949 |